Figure 1:
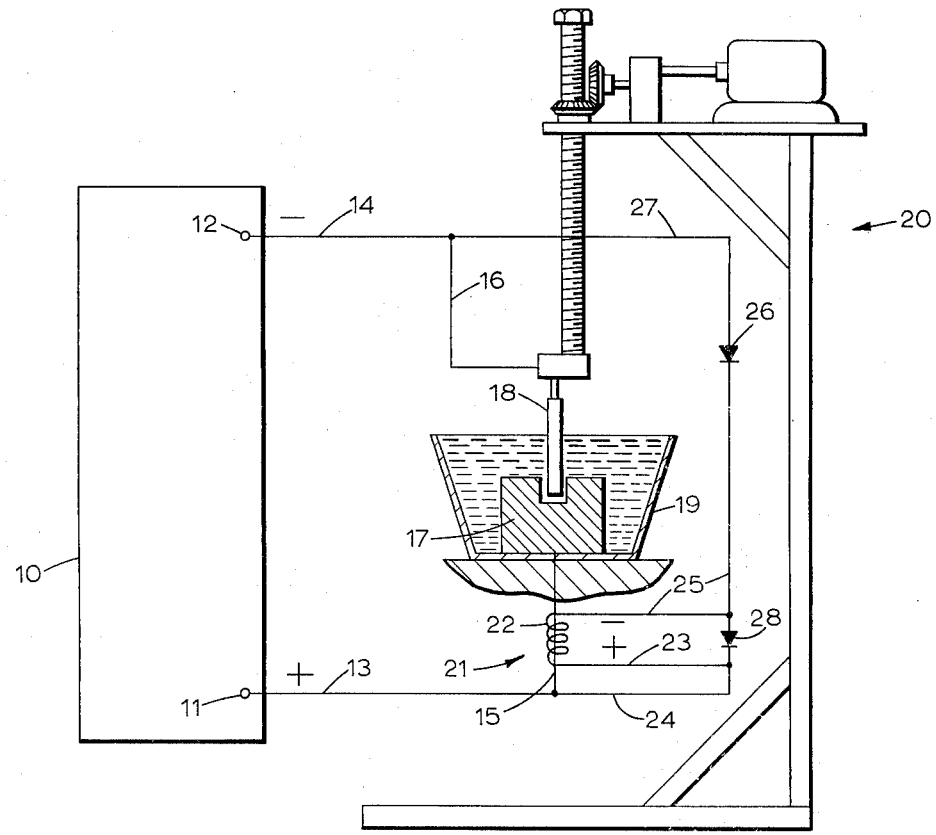

Sept. 14, 1965  R. L. HENRY  3,206,639

ELECTRICAL DISCHARGE MACHINING APPARATUS

Filed July 23, 1962

*INVENTOR.*
ROBERT L. HENRY

BY

*ATTORNEYS*

United States Patent Office 3,206,639
Patented Sept. 14, 1965

3,206,639
ELECTRICAL DISCHARGE MACHINING
APPARATUS
Robert L. Henry, Cincinnati, Ohio, assignor to The
Cincinnati Milling Machine Co., Cincinnati, Ohio, a
corporation of Ohio
Filed July 23, 1962, Ser. No. 211,728
2 Claims. (Cl. 315—289)

This invention relates to electrical discharge machining apparatus of the type in which intermittent sparking is caused to occur in a spark gap defined by the closely spaced surfaces of a workpiece and an electrode tool. The machining action is produced by the erosion of the workpiece surface by the spark discharges. These discharges cause cratering of the workpiece material beneath the electrode tool and a cavity having a shape corresponding to the shape of the tool is thereby produced in the workpiece. In order to maintain a uniform gap spacing between the tool and the workpiece as the cutting proceeds, suitable means must be provided to feed the tool toward the workpiece at a rate corresponding to the rate of metal removal. Also, some provision must normally be made to cause a dielectric fluid to be circulated through the gap in order to provide a proper environment for the electrical discharges and also to remove the particles of material dislodged from the workpiece.

The present invention is not concerned with the electrode feeding means or the dielectric supply equipment, both of which are of well known construction and are commercially available from suppliers of electrical discharge machining apparatus. It is concerned instead with the provision of an improved spark discharge circuit which causes the sparks produced in the gap to be quickly and positively extinguished. Thereby, the time required for deionization of the gap is reduced and more rapid sparking across the gap is accomplished with a resulting improvement in rate at which metal is removed from the workpiece. The sudden and abrupt extinguishment of the spark has also been found to enhance the disruptive action of the sparks on the workpiece material and to result in a more effective cutting action than when the spark discharge is permitted to decay more slowly and uncertainly as in the case of the previously known types of circuits. It has also been found that where the invention is applied to an apparatus having a relaxation oscillator type of impulse generator, the frequency of sparking will automatically be increased. This probably results from the rapid deionization of the gap after each spark discharge thereby permitting quicker recharging of the storage capacitor.

The improvements mentioned above are obtained by the incorporation of a gap feedback path in the discharge circuit which impresses a voltage pulse of the same polarity as the spark producing impulse across the spark gap during the initial portion of the spark discharge. Thereby, a positive feedback voltage is provided which has a regenerative effect upon the spark discharge. The effect of this feedback voltage is to overbuild the spark or arc occurring across the gap and to render it unstable and subject to sudden collapse. Hence, when the current flowing through the gap has reached its peak value and the voltage pulse from the feedback circuit has fallen to zero, a degenerative effect is produced and the overbuilt spark or arc is caused to abruptly collapse as the current diminishes. The spark is therefore quickly extinguished and the usual tapering off phenomena of a spark discharge at the end of the impulse is avoided and deionization of the gap is quickly and positively achieved.

It is, therefore, a further object of the invention to provide a gap feedback circuit for a spark discharge machining apparatus which is connected to the gap in a regenerative sense so as to apply across the gap, during the initial portion of the spark discharge, a voltage pulse which is of the same polarity as the spark producing impulse.

With these and other objects in view, which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

In the drawings:

FIG. 1 is a diagrammatic view of an electrical discharge machining apparatus incorporating the new spark extinguishing circuit.

Figure 2A:
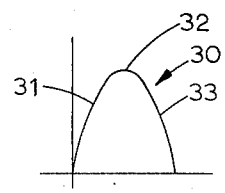
Figure 2B:
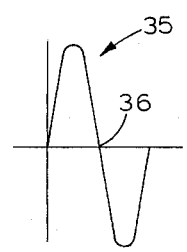
Figure 2C:
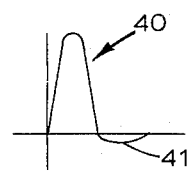

FIGS. 2a, 2b, and 2c are curves illustrating the operation of the circuit shown in FIG. 1.

The apparatus shown in FIG. 1 includes as impulse generator 10 which may be any one of the various known types of spark impulse producing devices, such as a rotary spark gap generator, a multivibrator driven generator, a static impulse generator, a relaxation oscillator, etc.

The positive and negative output terminals 11 and 12 of the generator 10 are connected by leads 13 and 14 to conductors 15 and 16 which, in turn, are connected to the workpiece 17 and the electrode tool 18, respectively. The workpiece may be suitably supported within a tank 19 containing the dielectric fluid, and the tool may be supported for movement relative to the workpiece by a drill press type of supporting structure 20.

The equipment thus far described constitutes the basic electrical discharge machining system, the construction and operation of which are sufficiently well known to eliminate any need for further explanation thereof.

The novel feedback circuit includes a transformer 21 which, as shown in FIG. 1, may be constituted of a secondary winding 22 of a considerable number of turns and the conductor 15 which constitutes a single turn primary winding. The transformer may desirably be of the toroidal type in which the secondary winding is ring wound on an annular core (not shown) of ferrite material. The conductor 15 is passed through the center of the core and serves as a single turn primary winding of the transformer. One terminal of the winding 22 is connected by conductors 23 and 24 to the conductor 15 which is attached to the workpiece. The other terminal of winding 22 is connected by a conductor 25, a diode 26 and a conductor 27 to the conductor 16 which is attached to the electrode tool. The diode 26 is so poled as to block current flow from the tool to the workpiece when the spark producing impulse from the generator 10 is of the polarity shown in FIG. 1. Thus, during the period of voltage rise across the gap before sparking takes place, no current can flow through the diode and the secondary winding 22. In other words, this will behave as an open circuit and prevent short circuiting of the gap.

When the voltage between the workpiece and tool reaches the breakdown potential of the gap, a spark discharge will be initiated and a current pulse, as represented by the curve 30 in FIG. 2a, will flow through the conductor 15. As the current flow through the gap increases, as indicated by the portion 31 of the curve, a voltage will be induced in the secondary winding 22 as indicated by curve 35 (FIG. 2b) and will be of the polarity indicated in FIG. 1. In other words, the polarity of the feedback voltage applied across the gap by the winding 22 is the same as that of the impulse supplied by the generator 10. Due to the sharp rise in the current flowing through the gap during the initial portion of the spark discharge, the voltage induced in the secondary winding 22 is larger than the potential applied across the gap by the generator 10. Therefore, current will flow from the positive terminal of winding 22 through the gap and through diode 26 to the negative terminal of the winding. This will have the effect of reinforcing the discharge taking place across the gap and will result in overbuilding the spark or arc discharge thereacross. When the current flowing through the gap reaches a maximum, as shown at 32 on curve 30, the voltage induced in winding 22 will fall to zero as indicated at 36 in FIG. 2b. The discharge across the gap will, therefore, no longer be supported by the feedback voltage and, as a result, the overbuilt arc will quickly collapse and permit the gap to deionize. Thereby, higher sparking rates and greater metal removal rates are made possible by the new principle of operation embraced in the above-described gap feedback circuit.

When the current through the gap collapses, as indicated at 33 in FIG. 2a, a sizable voltage of reverse polarity will be induced in the winding 22. This voltage may be such as to exceed the inverse voltage rating of the diode 26 and a second diode 28 is therefore connected across the ends of the winding 22 to short circuit the winding upon the occurrence of this inverse voltage and thereby protect the diode 26. This action of the diode 28 is illustrated by the curve 40 (FIG. 2c) which represents the voltage across the terminals of the winding 22. The portion 41 of the curve shows the damping action provided by the second diode 28.

Referring to FIG. 1 of the drawings, it will be noted that diodes 26 and 28 are connected in series across the spark gap by conductors 15, 24, 25, 27 and 16. Since the diodes are both poled in the same direction and will conduct conventional current flow from the electrode tool 18 to the workpiece 17, they will act to prevent any reverse voltage from appearing across the gap as a result of the distributed inductance in the discharge circuit.

In thus describing the invention it is to be understood of course, that the foregoing disclosure is intended to be illustrative only and that changes and modifications can be resorted to without departing from the spirit of the invention as defined in the appended claims.

What is claimed is:

1. An electrical discharge machining apparatus comprising an electrode tool located in close proximity to the surface of a piece of work to be machined so as to form a spark gap therebetween, a source of energy for producing sparks in the gap between the work and the tool, a discharge circuit electrically connecting said source with said work and said tool for transmitting a spark producing impulse thereto, a gap feedback circuit, a current transformer having a primary winding connected in said discharge circuit and a secondary winding connected in said feedback circuit, and a unidirectional current conducting device connected in series with said secondary winding and so poled as to cause a voltage pulse of the same polarity as the spark proucing impulse to be applied across the gap during the initial portion of the impulse whereby the spark produced by the impulse will be augmented during the initial part of the impulse and extinguished during the terminal portion thereof to deionize the gap and prepare it for the next spark discharge thereacross.

2. The electrical discharge machining apparatus of claim 1 including a second unidirectional current conducting device connected in shunt across said secondary winding to protect said first-mentioned unidirectional current conducting device from the reverse polarity pulse produced by said secondary winding.

References Cited by the Examiner

UNITED STATES PATENTS

| 2,880,376 | 3/59 | Tajbl et al. | 315—289 |
| 2,969,482 | 1/61 | Bruma et al. | 315—207 |
| 3,062,985 | 11/62 | Webb | 315—227.1 |

FOREIGN PATENTS

| 862,902 | 3/61 | Great Britain. | |

DAVID J. GALVIN, *Primary Examiner.*

JAMES D. KALLAM, *Examiner.*